United States Patent [19]

Arnett

[11] 4,391,092

[45] Jul. 5, 1983

[54] MULTIPLE POSITION DIGITAL ACTUATOR

[75] Inventor: Samuel E. Arnett, South Bend, Ind.

[73] Assignee: The Bendix Corporation, Southfield, Mich.

[21] Appl. No.: 173,531

[22] Filed: Jul. 30, 1980

[51] Int. Cl.$^3$ .................. F02C 9/18

[52] U.S. Cl. .................. 60/39.29; 91/167 R

[58] Field of Search .................. 60/39.29, 39.27, 39.07; 91/167 R

[56] References Cited

U.S. PATENT DOCUMENTS

| | | | |
|---|---|---|---|
| 2,912,008 | 11/1959 | Blackburn | 137/623 |
| 2,967,545 | 1/1961 | Schmidt | 137/623 |
| 3,114,296 | 12/1963 | Smith, Jr. | 91/169 |
| 3,116,757 | 1/1964 | Donguy et al. | 137/625.11 |
| 3,190,608 | 6/1965 | Hassa | 251/121 |
| 3,275,964 | 9/1966 | Kumm | 335/259 |
| 3,534,720 | 10/1970 | DuBois | 123/119 |
| 3,537,355 | 11/1970 | Bliss | 91/51 |
| 3,635,438 | 1/1972 | Peters | 251/137 |
| 3,646,753 | 3/1972 | Colman et al. | 60/39.29 |
| 3,882,759 | 5/1975 | Formwalt et al. | 91/167 R |
| 3,996,964 | 12/1976 | McCombs | 60/39.29 |
| 4,114,648 | 9/1978 | Nakajima et al. | 137/625.5 |
| 4,137,710 | 2/1979 | Preti et al. | 60/223 |

FOREIGN PATENT DOCUMENTS

| | | |
|---|---|---|
| 407759 | 9/1966 | Switzerland . |
| 1007633 | 7/1964 | United Kingdom . |

*Primary Examiner*—Robert E. Garrett

*Attorney, Agent, or Firm*—William A. Marvin; Ken C. Decker

[57] ABSTRACT

An actuator particularly adapted to control a plurality of bleed air valves of a gas turbine engine is disclosed. The actuator comprises n solenoid pilot valves where $2^n$ is the number of actuation positions and $2^n-1$ is the number of bleed air valves to be actuated. The actuator receives as n bit digital signal corresponding to the number of bleed air valves to be actuated for a particular operating condition of the engine and the actuator converts this number into a correct mechanical position. The conversion is accomplished by a series of telescoping cylinder and piston assemblies each having an expandable chamber. Each chamber is independently contracted or expanded by an associated pilot valve controlling a pressure source in response to the presence or absence of a particular bit in the digital word. The size of the expandable chamber of each assembly is related to the others by ascending powerts of two and correspond to a bit position in the digital input signal.

11 Claims, 3 Drawing Figures

ACTUATION TABLE

| SOLENOID 114 | SOLENOID 112 | SOLENOID 110 | POSITION |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

MULTIPLE POSITION DIGITAL ACTUATOR

BACKGROUND OF THE INVENTION

The invention pertains generally to actuation devices and is more particularly directed to multi-positional actuation devices which are controlled by an electronic digital processor.

For the regulation of the operation of many apparatus today there is necessitated the physical positioning of a control member according to a schedule or control law. Usually, the mechanical positioning of the control member is accomplished by an actuation device responding through an interface to a control signal calculated by a controller. Increasingly, the control signal will be calculated by a controller including a digital electronic processor which will regulate the positioning of the actuator as a function of a digital output word. Heretofore, the conversion of the information contained in the digital output word into a physical position has not been efficiently performed by conventional actuators.

Generally, either a digital-to-analog converter has been needed to control an analog actuator system positioning itself with respect to the analog signal or each bit of the digital control word is used to control an associated binary actuator determining a separate position. The former method is quite complex and requires relatively expensive actuators or stepper motors while the latter method restricts the number of physical actuations controlled to the number of bits contained in the output word. Neither actuator technique is entirely satisfactory for the sophisticated digital control systems being developed for future utilization.

More specifically the control of the operation of combustion engines based on their operating parameters may require many multipositional actuators. For example, to control a combustion engine of the gas turbine type an electronic controller has been used to control actuators for the bleed air valves of the compressor, the stator vane positioning, the nozzle positioning, fuel control, and positioning of other control members. Additional control functions may be envisioned for multipositional actuators in the future.

With respect to a particular application for a multiposition actuator, the bleed air valves are a series of valves used to vent the compressor of a gas turbine engine when the air flow between adjacent stages is mismatched to prevent the compressor from stalling. These valves are used primarily for starting or other operational sequences where one or more of the series is opened to regulate the quantity of air being supplied to the final compressor stages. The air bleed valves have also been used to provide a supply of pressurized air to other areas of the engine system.

Previously, each air bleed valve has been controlled by an individual solenoid. These solenoids were controlled by a digital word where one bit was assigned to each valve. The presence of a bit in the control word would actuate a particular air bleed and the absence of a bit would close it. However, this system mandates that each solenoid will be large or mechanically powerful enough to perform the task assigned. Since the solenoid valves work against compressor pressure they have been by necessity relatively heavy. The excess weight of these valves in gas turbine engine systems for aircraft is viewed critically.

Moreover, the use of these large solenoids requires that a separate driver circuit be used for each one. The logic level developed digitally have to be transformed into power levels sufficient to drive the large solenoids. These drivers consume considerable amounts of power which must be generated onboard in aircraft. The increased weight for aircraft of the electric generation devices used to create this excell power is also undesirable.

SUMMARY OF THE INVENTION

The invention provides an improved actuator which converts a digital word into an actuation position directly. When used in a turbine engine system for aircraft the novel actuator reduces the need for excessively large solenoids and consequently, their excess weight.

The actuator comprises a plurality of n pilot solenoids where $2^n$ is the number of actuation positions controlled by the digital word. Each pilot solenoid regulates the pressure input from a fluid source to an associated expandable chamber of a piston cylinder combination. A particular chamber is expanded by one state of an associated pilot solenoid signifying a specified level of one bit of the digital signal and is contracted by the other state of the pilot solenoid signifying the opposite level of the digital signal bit. Therefore, there are n piston cylinder combinations, each under the control of a different bit in the digital word.

The n piston cylinder combinations are telescoped within each other to form an actuation assembly that positions an actuating piston according to the combination of expandable chambers which are pressurized. The distance that one expandable chamber moves the actuation piston compared to the next adjacent piston is related by a power of two. Hence, the piston cylinder combinations become mechanical place holders related to a bit position in the digital word. By this means the absence or presence of a bit in the digital word translate directly into a mechanical positioning based on bit position. Therefore, all digital numbers than can be represented by an n bit digital word, $2^n$, can be represented in actuation combinations of the piston cylinder assemblies and thus in physical positioning of the actuator piston.

A number of distinct advantages are obtained from an actuator constructed in this manner. In aircraft applications one important advantage is weight savings when used in an air-bleed control system. The individual large solenoids of the previous systems are replaced by much lighter pilot valves of a fewer number. Where prior to the invention n air bleeds were controlled with an n bit digital word now $2^n$ air bleeds can be controlled. The greater the number of bleed valves used formerly for a particular engine the greater the savings will be. Additionally, the driver circuits which were used to transform logic level signals into control level signals can be eliminated or drastically reduced. The pilot solenoids consume much less power and if judiciously chosen can be run directly from the output ports of a microprocesser or logic circuitry. This feature represents not only a circuitry savings but an electrical power capacity reduction for an aircraft electrical generator system which translates directly into a weight savings.

The weight savings can be considerable because the invention takes advantage of the mechanical force amplification available by controlling a pressure source with the piston-cylinder assemblies. This amplification can be obtained readily without sacrifice in particular applications because many engines already include fluid power sources having excess capacities. Thus, the actuator can use small or pilot solenoids to produce large mechanical forces. In aircraft or other applications using a gas turbine engine the compressor airflow or a starter motor airflow can be utilized for this function.

These and other objects, features, aspects, and advantages of the invention will be more clearly understood and better explained if a reading of the detailed disclosure is undertaken in conjunction with the appended drawings wherein:

DETAILED DESCRIPTION OF THE PREFERRED EMBODIMENT

Figures 1, 3:
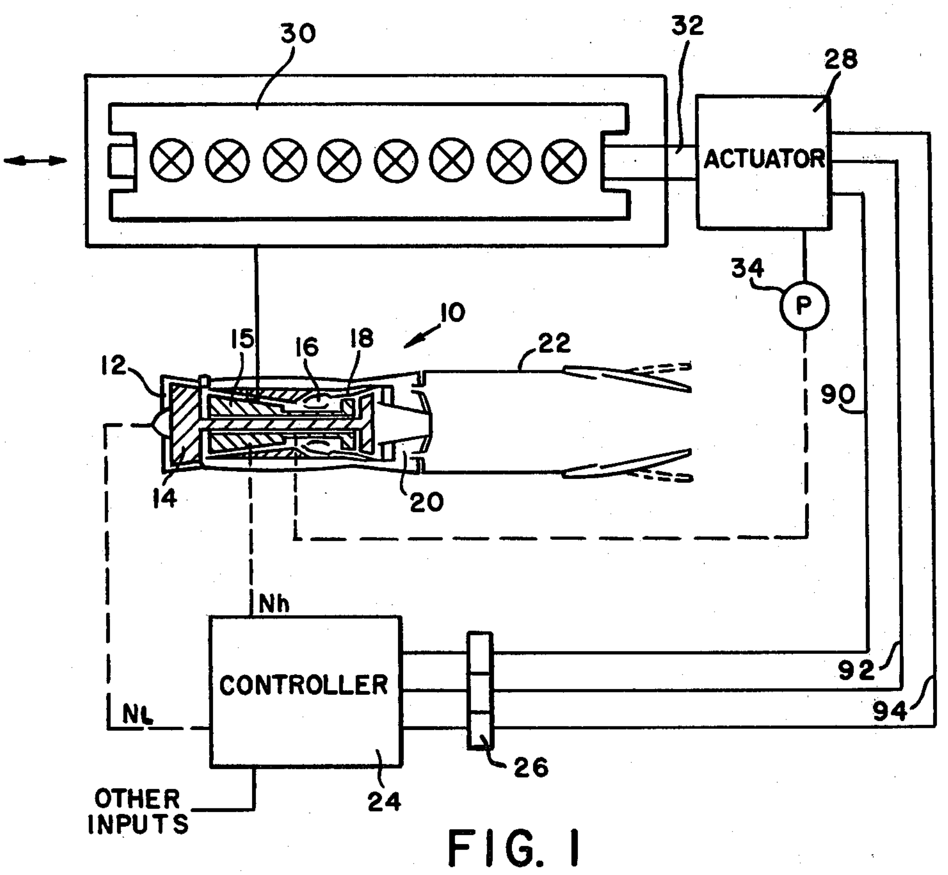
FIG. 1 is a schematic block diagram illustrating an air bleed control system for a gas turbine engine utilizing a multi-positional actuator constructed in accordance with the invention.
FIG. 3 is an actuation table illustrative of the translation of digital numbers into physical positions of the actuator.

With reference now to FIG. 1, there is shown an air bleed control system for a turbo-jet engine utilizing a multi-positional actuator constructed in accordance with the invention. The turbo-jet engine generally designated as 10 includes an air inlet 12, and a low pressure compressor 14, a high pressure compressor 15, a burner section 16, a turbine section 18, an exhaust nozzle 20, and an afterburner 22. Air drawn through the inlet is compressed by the two compressor sections 14 and 15 and when fuel is injected into the burner section 16, a highly energetic burning gas is exhausted through nozzle 20 to be reburned in afterburner 22. As is known the reaction of the engine to the exhaust gas is a forward thrust used for motive power. The turbine section 18 drives the compressor stages 14, 15 by consuming a portion of the exhaust gas energy before it exits the nozzle. Inasmuch as this invention is not primarily concerned with the reaction engine, and its parts are conventional, it will not be more fully described.

Between the low pressure compressor section 14 and the high pressure compressor section 15 is located a plurality of air bleed valves in an assembly 30. These valves are used to vent the pressurized air from the low pressure output compressor before it is input to the high pressure compressor stage. It is known that these may be used for starting, other bleed sequences, or for powering other auxiliary devices in an aircraft. Such other auxiliary devices include anti-icing mechanisms or boundary layer controls.

The assembly 30 for the actuation of the air bleed valves comprises a tubular actuation piston or element 32 from a multi-positional actuator 28. The actuator is connected to an electronic controller 24 through an interface circuit 26. The interface 26, for example, if the controller 24 is microprocessor would preferably be the microprocessor output ports.

The controller 24 if scheduling a starting sequence will have as an input the speed signal Nl from the low pressure compressor and the speed signal Nh from the high pressure compressor 15. Noting the differences between these two input signals will allow the controller to schedule an output to the interface circuitry 26 in the form of a three bit digital word. It is readily apparent that other inputs may be provided to the controller 24 for scheduling the auxiliary devices or for different sequencing during startup or other control. Other engine parameters that may be useful in air bleed control are temperatures and pressures of the turbine and compressors.

Power for the multipositional actuator is obtained from a pressure source 34 which can alternatively be supplied from a tap of the compressor section of the engine or from a pressure source such as an air starter motor or the like. Other sources of fluid pressure that are readily available may also be used. Pressure sources found in a gas turbine engine system include high pressure fuel and hydraulic pumps or the like.

The actuator 28 receives the digital number and converts it directly into a position of the actuator piston 32 by a piston cylinder combination assembly which will be more fully described hereinafter. The number of positions of the actuator piston 32 is related to the maximum number of discrete states represented by the digital word. In the present example the digital word has three bit or places and therefore, the actuator position will have eight discrete physical positions.

Figure 2:
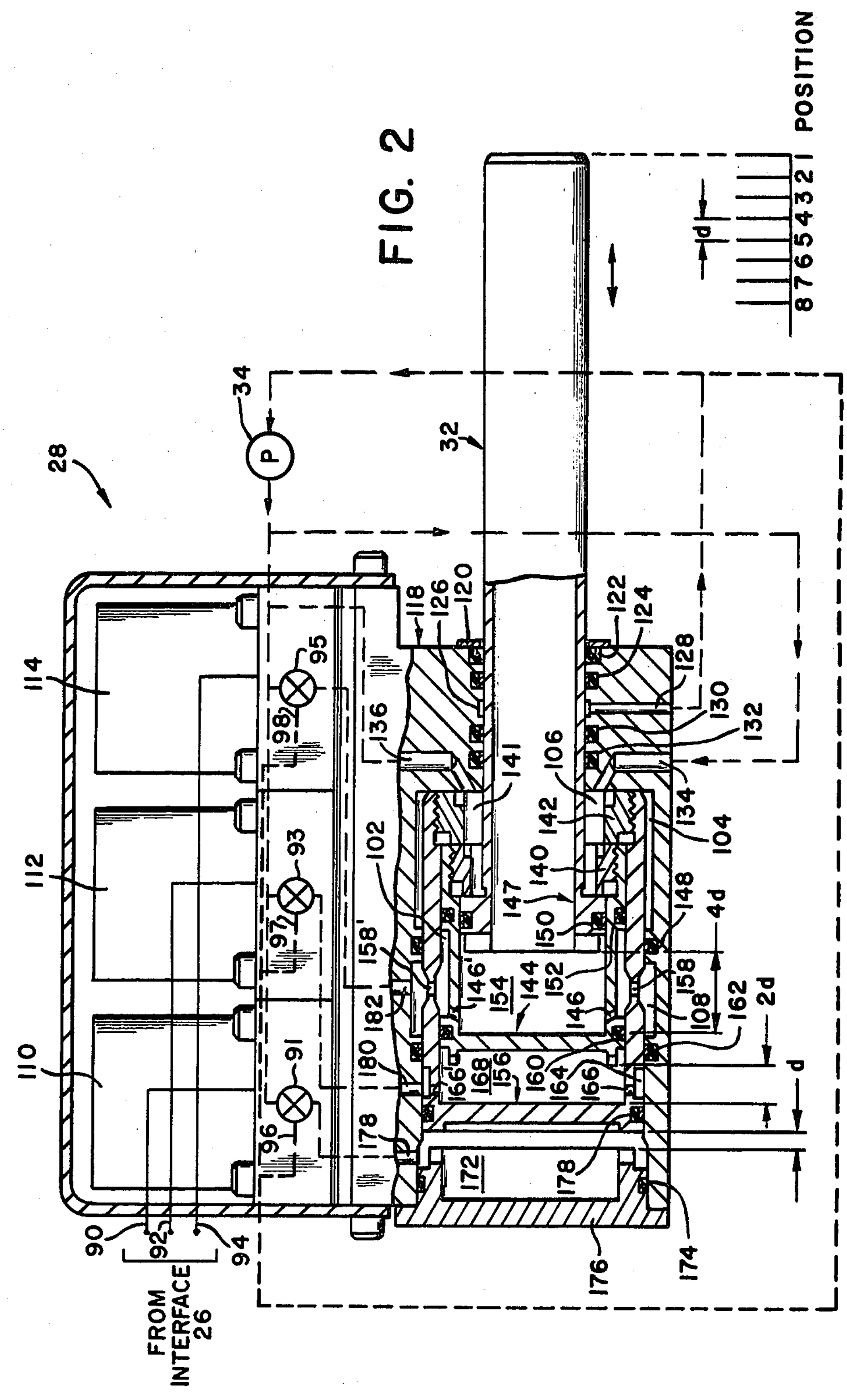
FIG. 2 is a partially cross-sectional side view of the actuator used in the system illustrated in FIG. 1.

The actuator 28 will now be more fully explained with reference to FIG. 2. The actuator 28 comprises three pilot solenoids 110, 112, and 114, respectively, which are adapted to receive the digital input signal and position an actuator piston 32 with respect to the value of that input. There are three solenoids present, each associated with one bit of the digital input, and there are $2^n$ or eight positions available for the actuator piston 32. Assuming one position will be taken to signify that all the air bleeds are closed, there will then be seven positions remaining, one to correspond to the opening of each air bleed or the extent of opening of one valve.

The coil of each solenoid 110, 112, and 114 is connected via signal lines 90, 92, and 94, respectively, to the digital signal through interface 26. A high voltage level on a signal line, representing that a bit is present in the digital signal, will energize the coil and actuate a three-way valve of the solenoid. The solenoids, for example, solenoid 110, upon actuation will vent a pressure port 178 to the atmosphere via vent 96 with a valve 91. Upon deenergization the pressure port 178 will be connected through the valve 91 to pressure source 34. Similarly, solenoids 112, 114, actuate valves 93 and 95, respectively, to connect pressure ports 180, 182, to vents 97, 98. When deactivated the valves 93, 95 will communicate pressure ports 180, 182 to the pressure source 34. The vents are connected to return fluid back to the pressure source 34 through return conduits 36.

Therefore, a low voltage level in a bit position for a corresponding solenoid will vent a pressure port and a high level will pressurize it. This method will transform the digital electrical signal at signal lines 90, 92, and 94 into a fluidic pressure signal of a binary nature at the ports 178, 180, and 182. The fluidic signal is subsequently further transformed into mechanical actuation motion by a piston-cylinder assembly to linearly move actuator piston 32 through its eight positions.

Each of the solenoids 110, 112, and 114 is preferably a conventional low power solenoid that can be actuated without a large power consumption or complex driving circuitry. Advantageously, the solenoids can be operated directly from the digital gate levels of the controller such as those found on the output ports of a microprocessor or the like. Normally, these gate levels are between 5 volts and 15 volts for a digital control system.

The pressure source 34 in combination with the piston cylinder assemblies then provides the needed force amplification for the movement of the actuation piston against the pressure of the compressor. As the actuator is depicted in FIG. 2, the actuator piston 32 is at its furtherest rightward limit and will move in seven more equal increments of distance d to the left upon actuation by the digital signal. An actuation table, labeled FIG. 3, describes the correspondence between the values of the digital signal states and the actuator piston position.

The actuator piston 32 is essentially an elongated actuation element of a hollow tubular shape connected integrally to a piston-shaped flange 147 at its actuation end. The piston extends through an aperture formed in a base 118 of the actuator 28. The piston 32 is sealed hydraulically by dual rings 130 and 132 of suitable material compressed between the actuation piston and a set of grooves cut in the aperture of the base 118. Even with this dual seal there is some hydraulic pressure that may escape through the aperture and a weepage ring 126 has been cut in the aperture to drain the fluid pressure which escapes. The weepage ring 126 communicates to a weepage port 128 which returns the escaped fluid to low pressure return of the fluid source 34 via a suitable conduit.

Another ring 124 of lesser sealing capability is compressed between the actuator piston 32 and a groove cut in the aperture to provide a final seal for the actuator piston 32. To lubricate the actuation piston 32 an oil-impregnated packing material 122 is provided in a step cut with the aperture of the base 118. Packing material 122 is retained in the step by a face washer 120 that fits against the base 118.

The flange 147 of the actuation piston 32 is telescoped into a generally cylindrically shaped first cylinder 144. The first cylinder is closed at one end and open at the other. The first cylinder 144 retains the flange of the actuation piston 32 by the means of a centrally bored first annular nut 140 being screwed onto a threaded portion at its open end. The actuation element extends through the center bore of the first nut 140 and is free to move reciprocally depending on the movement of the flange 147. Fluid pressure communication is prevented between the open end of the first cylinder and the closed end of the cylinder by a ring 150 compressed in a groove cut circumferentially around the flange 147. The flange 147 is operable to move between the closed end of the first cylinder and a position where it is stopped by abutment to the first nut.

The first cylinder and actuation piston form a first piston assembly which is telescoped into another generally cylindrical second cylinder 156. As is the first cylinder, the second cylinder is closed at one end and open at the other. The second cylinder 156 retains the first piston assembly by a centrally bored second annular nut 142 screwed onto a threaded portion at the open end thereof. The actuation element additionally extends through the center bore of the second nut and is free to move reciprocally depending upon the movement of the first piston assembly. Fluid pressure communication is prevented between the open end of the second cylinder and the closed end by a set of rings 152, 160 compressed in grooves cut circumferentially around first cylinder 144. A first auxiliary chamber 102 is defined by notch machined around the outside of the first cylinder and the inside wall of the second cylinder. The first auxiliary chamber 102 is also isolated from fluid communication by rings 152, 160. The first piston assembly is operable to move between the closed end of the second cylinder and a position where it is stopped by abutment to the second nut.

The assembly of the first piston assembly and the second cylinder 156, forming a second piston assembly is mounted within a generally cylindrical base cavity 104 in the base 118. The base cavity is open at one end and closed at the other end. The cavity is sealed at its open end by an end cap 176 and ring 174 compressed in a groove cut circumferentially therein. The actuation element, as previously mentioned, extends through the aperture in the base cavity 104 and is free to move reciprocally depending upon the movement of the second piston assembly. Three rings 148, 162, and 178 block fluid communication between the closed end and open end of the base cavity. In addition, the ring set 148, 162 prevent fluid communication to and from a second auxiliary chamber 108 formed from a notch machined around the inside wall of the base cavity 104. Still further, the ring set 162, 178 prevents fluid communication to and from a third auxiliary chamber 164 defined by a groove cut in the outside wall of the second cylinder 156. The second piston assembly is operable to move between the closed end of the base cavity and a position where it is stopped by abutment to the end cap 176.

The telescoping assembly of pistons and cylinders described, separates the base cavity into a number of expansible and contractable pressure chambers. A variable volume pressure chamber 154 is defined by the inner wall of the first cylinder and the flange of the actuator piston 32. Another variable volume pressure chamber 168 is defined between the inside wall of the second cylinder and the closed end of the first cylinder. A third variable volume chamber 172 is defined by the end cap and the closed end of the second cylinder 156. Each of the variable volume pressure chambers may have its volume changed by reciprocation of the respective telescoping elements defining its boundaries. Specifically, actuator piston 32 reciprocates in the first cylinder to change the volume of chamber 154, the first piston assembly 144 reciprocates in the second cylinder to change the volume of the pressure chamber 168, and the second piston assembly reciprocates in the base cavity to change the volume of the pressure chamber 172.

Each variable volume chamber is associated with an individual pressure port. Specifically, pressure port 178 communicates directly with chamber 172 while pressure ports 180 and 182 communicate through the auxiliary pressure chambers to chambers 168, and 154, respectively. Pressure port 180 communicates initially to the third auxiliary chamber 164 and then to chamber 168 via vents 166, 166'. Similarly, pressure port 182 communicates via the first and second auxiliary chambers to chamber 154. Initially, pressure port 182 communicates to second auxiliary chamber 108 and it to the first auxiliary chamber 102 through fluidic connection by apertures 158, 158'. The first auxiliary chamber 102 then communicates with chamber 154 via vents 146, 146'.

Consequently, the pressure chambers are, because of their association with individual pressure ports, each associated with individual signal lines and therefore, bits of the incoming signal. A high level on a signal line, indicating the presence of a bit, will vent the respective chamber and a low level on the signal line, indicating the absence of a bit, will pressurize the chamber.

Pressure ports 134 and 136 are provided to supply a bias chamber 106 with fluid pressure from supply 34.

The bias chamber 106 is formed by that part of the base cavity between ring 148 and the closed end of the base cavity. Pressure in this chamber causes movement of the piston cylinder assemblies when the expandable chambers 154, 168, and 172 are vented. Movement by the piston cylinder assemblies in the other direction is caused by the force imbalance because of the differing areas over which the pressure source operates.

In operation, the actuator piston moves to positions 1 through 8 by venting or pressurizing combinations of the chambers 154, 168, 172, according to presence or absence of bits in the digital signal. Energizing solenoid 110 causes the second cylinder to move a distance d and thereby move actuation piston 32 an identical distance. Energizing solenoid 112 causes the first cylinder to move a distance *2d* and thereby move the actuation piston an identical distance. Finally, energizing solenoid 114 causes the actuation piston to move a distance of *4d*. Thus, the movement of the actuation piston caused by individual solenoids is independent of the others but related to its position by a power of two. It is evident that combinations of these movements will then produce movements corresponding to the actuation table shown in FIG. 3.

While the preferred embodiments of the invention have been shown and described, it will be obvious to those skilled in the art that various modifications and changes may be made thereto without departing from the spirit and scope of the invention as defined by the following claims.

For example, the pressure source 34 has been described as an air pressure source. It would be obvious to provide any other type of fluid pressure source, vacuum or above ambient, to power the piston cylinder assemblies. It is recognized that what is necessitated by the invention is a difference in pressures between the chambers to operate the actuator. As a consequence, the actuator may be operated in the sequence described hereinbefore where it moves from right to left as combinations of chambers are vented or it could just as easily move from left to right by pressurizing combinations of chambers.

It is also well within the ordinary skill of the art to expand or reduce the invention to any force or size desired. An expansion of reduction of the invention may also be consummated with respect to the size of the digital word and number of actuation positions. Additional piston assemblies and pilot solenoids can be added to adapt the invention to any size of digital word.

What is claimed is:

1. A multiposition actuator for changing a N-bit digital word into N physical positions of an actuator element comprising:

N-1 telescoped open ended cylinders mounted in an open ended bore with the open ends of said cylinders disposed toward the closed end of said bore and an end cap closing the open end of said bore;

said actuator element including an elongated body passing through an aperture in the closed end of said bore and having a flange being a double acting piston disposed within the innermost cylinder;

said actuator element, cylinders and end cap forming N piston cylinder combinations wherein the piston area of each successive piston increases from the innermost combination to the outermost combination, and wherein the flange piston area disposed toward the closed end of the bore is less than the flange piston area for the innermost cylinder;

each of said combinations operable to move said actuator element independently of the other combinations through a distance controlled by an expandable chamber disposed between the cylinder and piston of each combination, each distance being related to the other distances by powers of the numeral 2;

N pilot solenoids, each associated with an expandable chamber and operable to control means for communicating a source pressure to a corresponding chamber and the source pressure from a corresponding chamber to a reference pressure and each associated with one of the bits of said digital input and actuated by one of the states of said bit;

a bias chamber defined by the open ends of said cylinders and the closed end of said bore;

means for communicating said source pressure to said bias chamber such that movement of the expandable chambers is accomplished by the force difference between the pistons because of the source and reference pressures acting over the differing piston areas.

2. A multiposition actuator as defined in claim 1, wherein said n piston cylinder combinations are telescoped within each other such that the distances moved by the actuation element for adjacent combination is in ascending powers of two.

3. A multiposition actuator as defined in claim 2, wherein:

said n piston cylinder combinations are telescoped within each other such that the distance moved by the actuation element for adjacent combinations is in descending powers of two.

4. A multiposition actuator as defined in claim 1, further including:

n pressure ports, each associated with and controlled by one of said n pilot valves for pressurizing said expandable chambers.

5. A multiposition actuator is defined in claim 4, wherein: each pressure port communicates with an associated expandable chamber by a series of auxiliary chambers.

6. A multiposition actuator as defined in claim 5, wherein: the number of auxiliary chambers between a pressure port and an expandable chamber is the power of two represented by the chamber minus one.

7. A multiposition actuator as defined in claim 6, wherein: said pressure source is a compresssed air source.

8. A multiposition actuator as defined in claim 7, wherein: said pressure source is a vacuum air source.

9. An air bleed control system as disclosed in claim 8, wherein:

said digital number is an n bit digital number.

10. An air bleed control system for a gas turbine engine including a compressor having more than one stage and a plurality N of air bleed valves controllable by an actuator, said system comprising:

an electronic controller means for generating a digital number indicative of the number of air bleed valves which are to be actuated, wherein said digital number is generated by said controller means as a function of at least one operating parameter of the engine;

an actuator, for receiving said digital number and transforming the number into a plurality of physical positions of an actuator element indicative of the number of air bleed valves which are to be actuated; and means for actuating the air bleed valves in response to the positioning of the actuator element.

11. An air bleed control system as disclosed in claim 10, wherein:

said actuator is operable to move said actuator element to n positions.

* * * * *